United States Patent [19]

Moran

[11] 4,386,384
[45] May 31, 1983

[54] FAULT RESPONSIVE PROTECTIVE DEVICE

[75] Inventor: Richard J. Moran, Milwaukee, Wis.

[73] Assignee: McGraw-Edison Company, Rolling Meadows, Ill.

[21] Appl. No.: 330,926

[22] Filed: Dec. 15, 1981

[51] Int. Cl.³ ............................................. H02H 3/08
[52] U.S. Cl. ...................................... 361/94; 361/96; 361/98
[58] Field of Search .................. 361/94, 95, 96, 97, 361/98

[56] References Cited

U.S. PATENT DOCUMENTS

| | | | |
|---|---|---|---|
| 3,946,281 | 3/1976 | Llona et al. | 361/96 |
| 3,970,899 | 7/1976 | Davis | 361/96 |
| 4,027,203 | 5/1977 | Moran et al. | 361/96 X |
| 4,271,444 | 6/1981 | Howell | 361/96 X |

*Primary Examiner*—Harry E. Moose, Jr.
*Attorney, Agent, or Firm*—Jon Carl Gealow; Hugh M. Gilroy

[57] ABSTRACT

An improvement to fault responsive protective devices, which employ timing capacitors, is provided by controlling the voltage of the timing capacitor by clamping it to a value slightly in excess of the voltage on a master timing capacitor. This allows the master timing capacitor to inhibit the operation of the improved fault responsive device without affecting the input to the timing capacitor. The inherent time constant produced by the timing capacitor is not altered. However, by clamping the voltage level of the timing capacitor only under appropriate conditions, the time current characteristic of the improved fault responsive protective device is altered only when those conditions occur which make it desirable to lengthen the interval before the fault responsive protective device responds to a fault.

5 Claims, 2 Drawing Figures

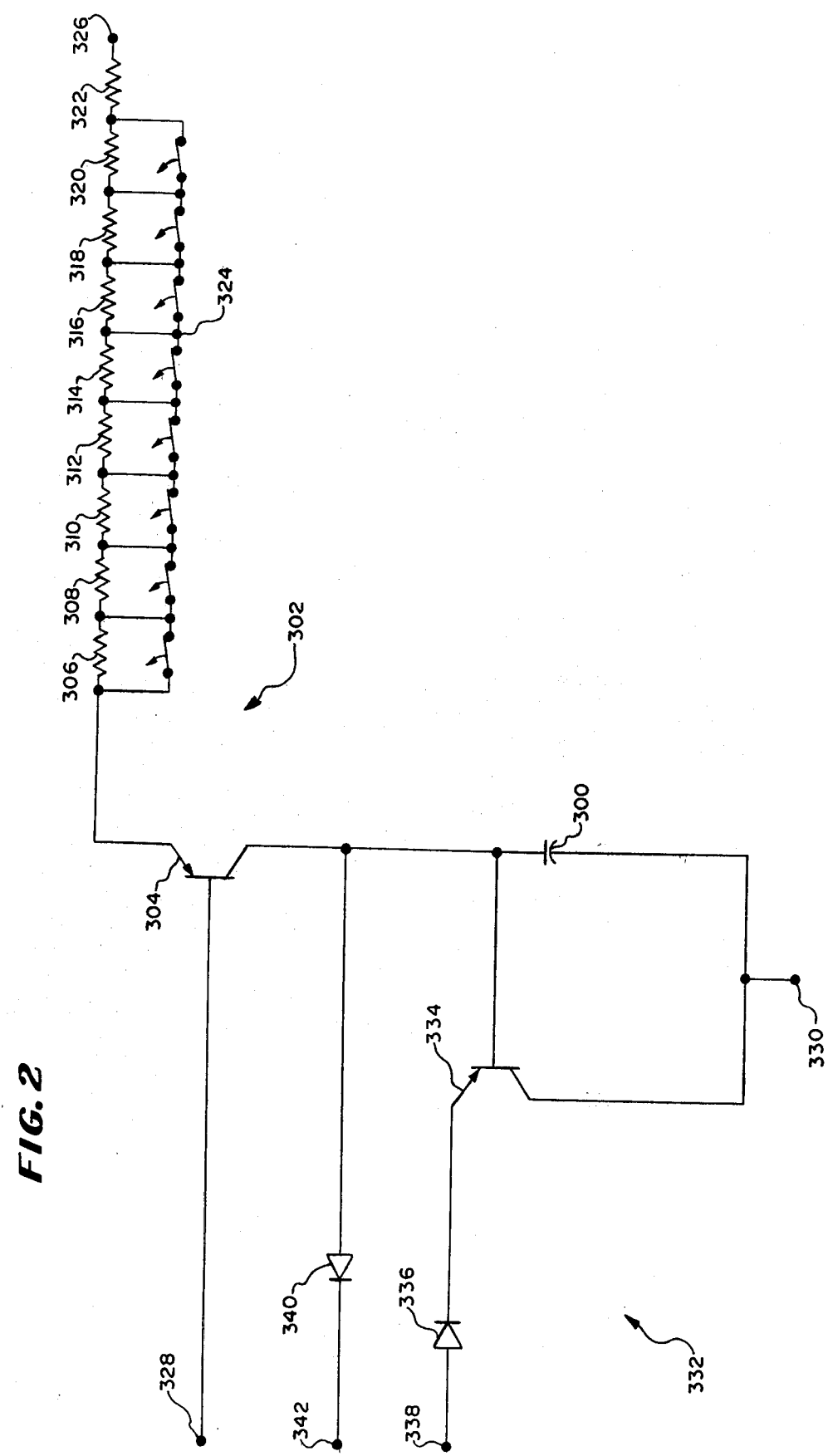

FAULT RESPONSIVE PROTECTIVE DEVICE

BACKGROUND OF THE INVENTION

This invention relates to an improvement in fault responsive protective devices, which employ timing capacitors to generate a time current characteristic inversely proportioned to fault magnitude, wherein the certainty of appropriate coordination among a number of fault responsive protective devices in a distribution system is improved. More particularly, the improvement relates to controlling the timing capacitor with a master timing capacitor when coordination among a series of fault responsive protective devices is jeopardized by faults of such a large magnitude that their individual time current characteristics tend to merge.

Generally in an electric power distribution system there are a great number of protective devices for interrupting excessive current flows which tend to damage the current conductors or other distribution equipment. It is most desirable to interrupt a fault, excessive current, with the protective device which is closest to the malfunction causing the fault in order to minimize the area of power outage. To this end a number of protective devices may be placed in series, so as to carry the same current. Then when a fault occurs, only the one closest to the fault should operate to interrupt the fault.

It is also desirable that a protective device respond quicker to faults of greater magnitude than to faults of lesser magnitude. However it is not desirable that a protective device respond quickly to every current in excess of design limits, since such currents may often be caused by a malfunction of such short duration that no harm to the system will occur. A branch a striking a power line due to a gust of wind can cause such a malfunction. Therefore, most protective devices therefore have time current characteristics which delay their response to less excessive current and yet accelerate their response, so that they respond more quickly, to faults of greater magnitude.

A graph of the time current characteristic, showing the time it takes for the device to respond to a fault of a specific magnitude, often results in a straight line when plotted on a log-log scale. Some care should be taken to coordinate among protective devices in a system so that the time current characteristic of an upstream protective device is always greater, i.e. responds more slowly, than a downstream device. Unless care is taken, a larger area than necessary will suffer power outages needlessly. Unfortunately at high magnitudes of fault the time current characteristics of many protective devices tend to merge. At these levels of fault, coordination among protective devices can be lost. When coordination is lost, several protective devices may respond, or an upstream protective device, i.e. closer to the power source, may respond before a downstream device. To ensure that coordination is not lost under these circumstances, a minimum time delay may be introduced for each of the devices, so that despite merger of their time current characteristics, the device furthest upstream will be the last to open because it has the longest minimum time delay.

A further complication can occur because all protective devices have finite design limits. If design limits are exceeded, and the protective device attempts to interrupt a fault, it may be destroyed.

An example of a protective device employed in a power distribution system is provided by U.S. Pat. No. 4,027,203 issued to myself and William N. Le Court. The device, described fully in the patent, generates its time current characteristic by employing a timing capacitor. Once excessive current is detected in the protected conductor, the timing capacitor is charged with a current which is proportional to the current in the conductor. After charging of the timing capacitor begins, or pick-up occurs, the proportional charging current continues to charge the timing capacitor as long as excessive current is flowing. At a preselected level of voltage on the timing capacitor, an output stage is activated to interrupt the current in the protected conductor. A modification of the device as illustrated in FIG. 2 of U.S. Pat. No. 4,027,203, provides a minimum time delay by clamping the inputs to the device. The inputs are proportional to currents in the conductors being protected. This clamping, achieved by a Zener diode, introduces a nonlinearity into the current used to generate the time current characteristic, and if several time current characteristics are generated by using several timing circuits all are affected, but do not achieve the same minimum time delay for each time current characteristic. Under some conditions, because of the comparatively high currents in the rectified output of the current transformers, failure of the Zener diode due to excessive power dissipation may occur. A time delay achieved with Zener diode clamping cannot be conveniently altered.

SUMMARY OF THE INVENTION

With the present invention, an improvement to fault responsive protective devices, which employ timing capacitors to generate time current characteristics, is provided. The improvement conveniently assists appropriate coordination among fault responsive protective devices in a power distribution system. The invention employs a master timing capacitor that is charged at selected rates by charging means. The master timing capacitor is interconnected to the timing capacitor of the fault responsive protective device by a coupling means that clamps the voltage on the timing capacitor to a value slightly in excess of that on the master capacitor. As a result the timing capacitor cannot reach the predetermined tripping voltage before the voltage on the master timing capacitor closely approached the predetermined voltage. This inhibits the fault responsive protective device from operating regardless of the magnitude of the fault only when it is desirable to do so and does not otherwise affect its time current characteristic. Where it is desirable to have a particular delay which is only time dependent, a constant current source is employed as the charging means. The time of the delay is easily altered by providing a number of resistors which can be switched to provide a particular resistance value and, therefore, a particular constant current within a range of currents. By interrupting the charging of the master timing capacitor the fault responsive protective device can be "locked in" when the fault is of such a magnitude that it should not attempt to interrupt it. In a fault responsive protective device that has a number of time current characteristics, such as one for phase currents and another for ground currents, the improvement of the present invention may be selectively connected to all or any of the timing capacitors generating the time current characteristics. Further, by altering the current from the charging means, depending on which of the time current characteristics is sought to be affected, different inhibitions can be achieved on different characteristics.

BRIEF DESCRIPTION OF THE DRAWING

FIG. 2 is a circuit diagram of the improvement of the present invention.

DETAILED DESCRIPTION OF THE PREFERRED EMBODIMENT

Figure 1:
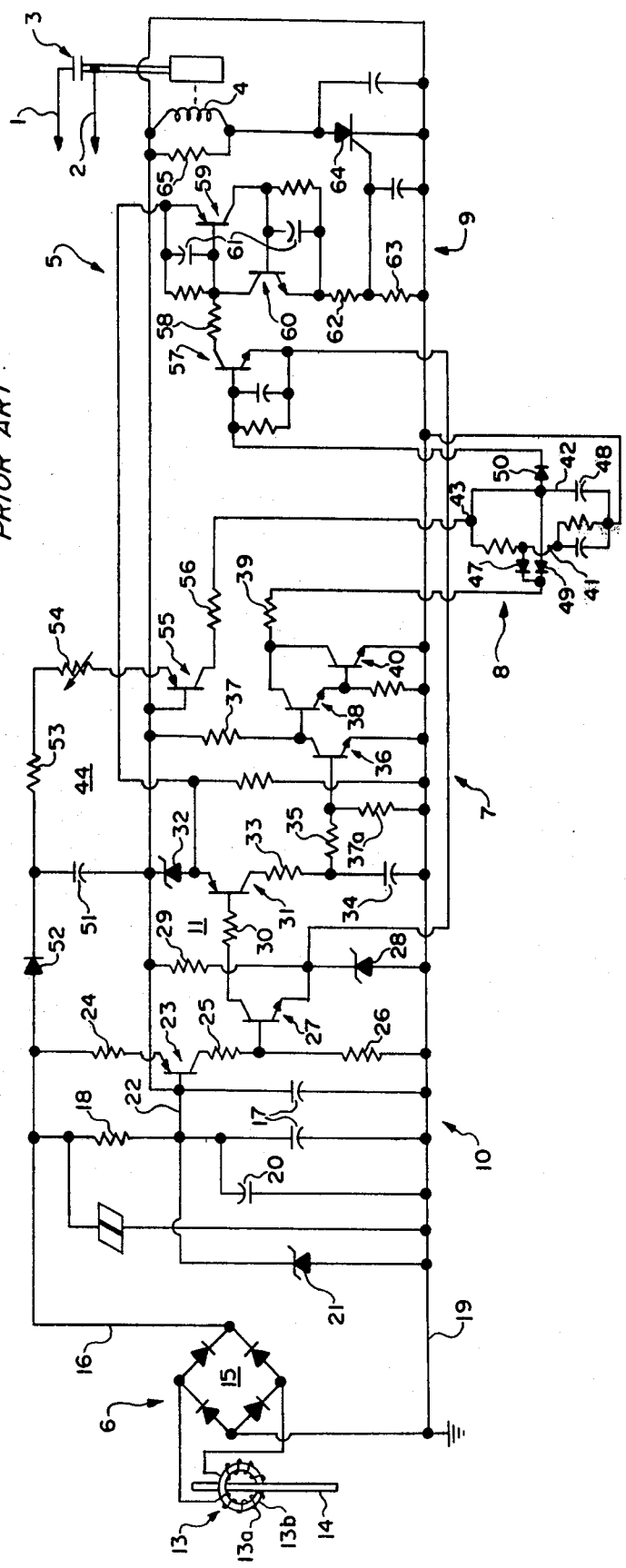
FIG. 1 is an example of a fault responsive protective device of the type to be improved.

An example of a fault responsive protective device employing a timing capacitor to generate a time current characteristic is provided by FIG. 1. FIG. 1 is reproduced from U.S. Pat. No. 4,027,203, discussed above, to illustrate the relationship between the improvement, shown in FIG. 2, and the type of device improved. Timing capacitor 48 in circuit 8 of FIG. 1 is charged by a rectified current proportional to conductor current through current input line 43 when an excessive value of conductor current exists. The timing capacitor 48 is continually discharged through transistor 40 unless excessive currents exist. When a preselected trigger voltage is reached, diode 50 conducts activating output circuit 9 to interrupt the fault.

The improvement illustrated in FIG. 2 includes a master timing capacitor 300. Charging means 302 for charging the master timing capacitor 300 is here shown as PNP transistor 304 with a plurality of resistors 306, 308, 310, 312, 314, 316, 318, 320 in series with the emitter of transistor 304. Emitter resistor 322 is also in series with transistor 304 to limit the current suppliable by charging means 302. Multipole switch 324 is appropriately interconnected with the plurality of resistors to act as switching means enabling the selection of a desired particular resistance value within a range. When terminal 326 is connected to an appropriate source of current, base current is supplied to transistor 304, through terminal 328, and terminal 330 is connected to ground, then master timing capacitor 300 will be charged by charging means 302. This charging will determine the voltage level of master timing capacitor 300 and is dependent on the current source, the amount of base current and the particular resistance value selected by switch 324.

Coupling means 332 is here shown as PNP shunting transistor 334 which has its base connected to master timing capacitor 300 and a blocking diode 336 connected to its emitter. When terminal 338 is connected to the positive side of a timing capacitor in a fault responsive protective device, such as current line 43 of FIG. 1, the voltage level of the timing capacitor may only exceed the voltage level of the master timing capacitor 300 slightly. If the voltage level of the timing capacitor 48 is less than the voltage level of the master timing capacitor 300, ignoring the small voltage drops across blocking diode 336 and the base emitter junction of shunting transistor 334, the voltage level of timing capacitor 48 is unaffected. Current can only flow from timing capacitor 48, and neither blocking diode 336 nor shunting transistor 334 are able to conduct. When the voltage level of the timing capacitor 48 rises above that of the voltage level of master timing capacitor 300 by an amount sufficient to overcome the small voltage drops of blocking diode 336 and shunting transistor 334, they are biased on and conduct current from timing capacitor 48, clamping the voltage level of timing capacitor 48. Since coupling means 332 is controlled by current from master timing capacitor 300, it is desirable that the gain of shunting transistor 334, or its equivalent, be high to avoid significant effect on the voltage level of master timing capacitor 300.

To provide a "lock in" feature for the fault responsive protective device, charging means 302 must be interrupted or terminal 342 must be biased to a value below the preselected trigger voltage. This can be done by modifying the circuit of FIG. 1 so that transistor 40 is turned on, when current levels which cannot be interrupted without harm exist in protected conductor.

Isolation diode 340 is connected to the positive side of master timing capacitor 300 to prevent current from flowing into its discharge path through terminal 342. When terminal 342 is connected to the junction of the cathodes of diodes 47 and 49, both timing capacitor 48 and master timing capacitor 300 begin charging and discharging at the same times.

When it is desirable to provide the fault responsive protective device with a minimum time delay, charging means 302 should be a constant current source. An example of a constant current source configuration may be provided by connecting terminal 326 to the cathode of Zener diode 21, and terminal 328 to the emitter of transistor 31. In such a configuration, where charging means 302 acts as a constant current source, the minimum time delay ($T_D$) is approximately equal to the value of capacitance of the master timing capacitor 300 (C) multiplied by the preselected trigger voltage ($V_T$), divided by the constant voltage at terminal 326 ($V_{CE}$) minus the constant voltage at terminal 328 ($V_{CB}$) divided by the total value of resistance (R) in the emitter lead of transistor 304; or, $T_D = C V_T/[(V_{CE}-V_{CB})/R]$.

Judicious selection of time delays will ensure that the fault responsive protective device closest to the malfunction will interrupt the fault, although the time current characteristics of the protective devices in the system have merged.

If a particular fault responsive protective device generates several time current characteristic curves, such as in a recloser having comparatively fast and slow curves, which also differ between phase faults and ground faults, the terminal 338 may be selectively connected to the timing capacitor, or timing capacitors, by selecting means such as relays. Further, the inhibition conditions can be changed among the various curves as is desired by varying the charging means 302 as described above.

The embodiment of my improvement illustrated in FIG. 2 was particularly chosen to show its operation in connection with FIG. 1. It should be understood that various modifications, changes, and variations may be made in the arrangement, operation and details of construction of the elements disclosed herein, without departing from the spirit and scope of this invention.

I claim:

1. In an improved fault responsive protective device which employs a time delay that is inversely proportional to fault magnitude by varying the voltage level of a timing capacitor at a rate which is proportional to fault magnitude until a predetermined voltage level is reached at said timing capacitor, which enables the protective device to respond to the fault, wherein the improvement comprises:

a master timing capacitor;

a charging means to cause current to flow into said master timing capacitor; and coupling means between said master timing capacitor and said timing capacitor which clamps the voltage level of said timing capacitor to a value slightly in excess of the voltage level of said master timing capacitor, whereby said fault responsive protective device is inhibited from operating before the voltage level of said master timing capacitor closely approaches said predetermined voltage level.

2. In an improved fault responsive protective device as set forth in claim 1, wherein said charging means comprises a constant current source.

3. In an improved fault responsive protective device as set forth in claim 2, wherein said constant current source has a plurality of resistors and a selector switching means for selecting a particular resistance value to cause a particular constant current, within a range of currents, to flow from the constant current source.

4. In an improved fault responsive protective device as set forth in claim 1, wherein said coupling means comprises:
a blocking diode which enables the voltage level of said master timing capacitor to control the voltage level of said timing capacitor only when the voltage level of said timing capacitor is slightly in excess of the voltage level of said master timing capacitor; and
a shunting transistor to conduct current from said timing capacitor thereby affecting its voltage level only when the voltage level of said timing capacitor is slightly in excess of the voltage level of said master timing capacitor.

5. In an improved fault responsive protective device which employs a time delay that is inversely proportional to fault magnitude by varying the voltage level of a timing capacitor at a rate which is proportional to fault magnitude until a predetermined voltage level is reached at said timing capacitor which enables the protective device to respond to the fault, wherein the improvement comprises:
a master timing capacitor;
a constant current source which has a plurality of resistors and a selector switching means for selecting a particular resistance value to cause a particular constant current, within a range of currents, to flow from said constant current source into said master timing capacitor;
a blocking diode which only enables the voltage level of said master timing capacitor to control the voltage level of said timing capacitor when the voltage level of said timing capacitor is slightly in excess of the voltage level of said master timing capacitor; and
a shunting transistor to conduct current from said timing capacitor thereby affecting its voltage level only when the voltage level of said timing capacitor is slightly in excess of the voltage level of said master timing capacitor whereby said fault responsive protective device is inhibited from operating before a minimum time determined by the values of the constant current and said master timing capacitor.

* * * * *